(12) United States Patent
Honma

(10) Patent No.: US 8,929,797 B2
(45) Date of Patent: Jan. 6, 2015

(54) MEDIUM TRANSPORT APPARATUS, SCANNER APPARATUS, AND RECORDING APPARATUS

(75) Inventor: Ryo Honma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 13/407,913

(22) Filed: Feb. 29, 2012

(65) Prior Publication Data
US 2012/0224903 A1 Sep. 6, 2012

(30) Foreign Application Priority Data

Mar. 1, 2011 (JP) ................................. 2011-044049

(51) Int. Cl.
| | | |
|---|---|---|
| G03G 15/00 | (2006.01) | |
| B65H 9/04 | (2006.01) | |
| H04N 1/00 | (2006.01) | |
| H04N 1/193 | (2006.01) | |
| H04N 1/12 | (2006.01) | |

(52) U.S. Cl.
CPC .... H04N 1/00588 (2013.01); *H04N 2201/0081* (2013.01); *H04N 1/193* (2013.01); H04N 1/00602 (2013.01); B65H 5/338 (2013.01); *B65H 2402/31* (2013.01); *B65H 2402/545* (2013.01); H04N 1/00628 (2013.01); *B65H 2404/612* (2013.01); H04N 1/00631 (2013.01); *H04N 1/12* (2013.01); H04N 1/00615 (2013.01)
USPC .......................................... 399/372; 271/245

(58) Field of Classification Search
CPC ............... B65H 2402/31; B65H 9/166; B65H 2301/331; B65H 5/36; B65H 57/28; B65H 9/004; B65H 9/006; B65H 2404/7414; B65H 9/002; B41J 13/0045
USPC ............ 271/242, 245; 400/579; 399/395, 372
See application file for complete search history.

(56) References Cited

U.S. PATENT DOCUMENTS

| | | | | |
|---|---|---|---|---|
| 6,805,347 | B2 * | 10/2004 | Kuramoto | ...................... 271/242 |
| 7,425,001 | B2 * | 9/2008 | Sano et al. | ..................... 271/242 |
| 2004/0094892 | A1 | 5/2004 | Kuramoto | |
| 2009/0161135 | A1 * | 6/2009 | Chung et al. | .................. 358/1.12 |
| 2010/0013147 | A1 * | 1/2010 | Katsura et al. | ................ 271/225 |
| 2010/0020370 | A1 | 1/2010 | Ishikawa | |

FOREIGN PATENT DOCUMENTS

| | | |
|---|---|---|
| JP | 06-191686 | 7/1994 |
| JP | 08-157107 | 6/1996 |
| JP | 11-139616 | 5/1999 |
| JP | 2002-068494 | 3/2002 |
| JP | 2005-001787 | 1/2005 |
| JP | 2010-028546 | 2/2010 |

* cited by examiner

*Primary Examiner* — Daniel J Colilla
*Assistant Examiner* — John M Royston
(74) *Attorney, Agent, or Firm* — Workman Nydegger

(57) ABSTRACT

A medium transport apparatus includes a medium guide member that forms part of the curved transport path and guides a medium to a downstream side, and that is provided so as to be capable of pivoting at an outward side from the curved transport path, and that changes the size of a space of part of the curved transport path by pivoting. The medium guide member has a pivot axis that is in an upstream side direction of a guide surface that guides the medium.

6 Claims, 4 Drawing Sheets

MEDIUM TRANSPORT APPARATUS, SCANNER APPARATUS, AND RECORDING APPARATUS

BACKGROUND

1. Technical Field

The present invention relates to medium transport apparatuses provided with curved transport paths that transport a medium while bending that medium, and to scanner apparatuses and recording apparatuses provided with such medium transport apparatuses.

2. Related Art

An ink jet printer serves as an example of a recording apparatus or a liquid ejecting apparatus. In recent years, what are known as complex machines, in which an ink jet printer is provided both with printer functionality and scanner functionality, have become mainstream. A complex machine is capable of reading a document and recording onto paper using a single machine, and is thus not only convenient, but also saves space.

There are cases where the scanner is provided with an auto document feeder (ADF) for the document, and is configured so as to be capable of automatically feeding and reading a plurality of documents. As a configuration for such an auto document feeder, JP-A-2010-28546 employs a configuration in which a document is fed out from a document tray, is inverted in a U-shape by a roller, and is transported to a reading position, after which the document is discharged toward a discharge tray.

Note that the configuration for inverting the sheet in a U-shape and transporting the sheet is not limited to auto document feeders provided in scanners, and is also used in paper transport paths of ink jet printers, as disclosed in JP-A-2002-68494 and JP-A-8-157107.

Incidentally, with an auto document feeder provided in a scanner, a paper transport apparatus in a printer, or the like, skew (inclination) in the paper has thus far been eliminated using paper feed control. For example, JP-A-2002-68494 discloses a skew removal method that uses the so-called "nip-and-release" technique. This skew removal technique carries out control so that a sheet is first nipped by a transport roller pair, and after the leading edge of the sheet has been fed downstream by the transport roller pair by a predetermined amount, and the rotation of the transport roller pair is reversed, thus releasing the leading edge of the sheet upstream from the transport roller pair. At this time, the sheet that has been released upstream from the transport roller pair flexes on the upstream side of the transport roller pair, and thus the leading edge of the sheet follows the transport roller pair; this removes the skew of the sheet.

Accordingly, it is desirable, from the standpoint of removing the skew with certainty, for the space where the sheet flexes upstream from the transport roller pair to be large; however, when not carrying out skew removal, a large space in the paper transport path makes it easier for path deviation to occur to the left and right, and is thus not desirable. In light of this situation, in JP-A-2002-68494, a mobile member that serves as an assisting member is provided in a curved inverting path. This assisting member (mobile member) is provided on the outer side of the curved inverting path, and is normally in a position that narrows the space of the paper transport path; however, when removing skew, the assisting member is pressed upon by the sheet and thus retracts to the outer side of the curved inverting path, thus securing a space in which the sheet can flex to a sufficient degree.

However, there are flimsy types of paper and rigid types of paper, and thus if the biasing force of a biasing unit that biases the assisting member is set for, for example, a flimsy type of paper, and a rigid type of paper is then transported, the assisting member will retract not only during skew removal but also during normal paper transport, and thus the original goal of the assisting member cannot be achieved. Conversely, if the biasing force of the biasing unit that biases the assisting member is set for a rigid type of paper, the assisting member cannot retract when carrying out skew removal for a flimsy type of paper, and thus the original goal of the assisting member once again cannot be achieved. In other words, it is difficult to set an appropriate load for the assisting member, and there has thus been a problem in that the level of allowance for that load is low. This type of technical problem is not considered by the past techniques disclosed in JP-A-2010-28546, JP-A-2002-68494, and JP-A-8-157107.

SUMMARY

It is an advantage of some aspects of the invention to provide a medium transport apparatus capable of setting a curved transport path provided with a mobile member that changes the size of a space in the curved transport path appropriately in accordance with the usage conditions, regardless of the rigidity of the medium.

A medium transport apparatus according to a first aspect of the invention includes: a curved transport path that transports a medium while bending the medium; and a medium guide member that forms part of the curved transport path and guides the medium to a downstream side, and that is provided so as to be capable of pivoting at an outward side from the curved transport path, and that changes the size of a space of part of the curved transport path by pivoting. Here, the medium guide member has a pivot axis that is in an upstream side direction of a guide surface that guides the medium.

According to this aspect, the medium guide member (mobile member) that changes the size of the space of part of the curved transport path by pivoting has a pivot axis that is in the upstream side direction of the guide surface that guides the medium, and thus when the leading edge of the medium advances downstream while sliding on the guide surface of the medium guide member, of the force that the medium guide member receives from the medium leading edge, the component of the force that pivots the medium guide member is low, and thus the medium guide member is not easily pivoted.

After the leading edge of the medium has been fed downstream from the medium guide member, the medium is fed in reverse, and when the medium makes contact with the medium guide member by bulging outward from the curved transport path, of the force that the medium guide member receives from the medium, the component of the force that pivots the medium guide member is high; thus the medium guide member pivots with ease, and a large space in which the medium flexes is secured. Accordingly, it is possible to put the medium guide member in the appropriate state in accordance with the usage conditions, regardless of the rigidity of the medium.

According to a second aspect of the invention, in the first aspect, the medium guide member is provided in a state that narrows the space of part of the curved transport path when the medium guide member is in a posture in which the medium guide member is lowered in addition due to the biasing force of a biasing unit that biases the medium guide member, due to the medium guide member's own weight.

According to this aspect, the medium guide member is provided in a state that narrows the space of part of the curved transport path when the medium guide member is in a posture in which the medium guide member is lowered due to the biasing force of the biasing unit and the medium guide member's own weight. It is therefore not necessary to ensure a high biasing force for the biasing unit; a high level of stress is thus not placed on the constituent elements by the biasing force of the biasing unit, which makes it possible to prevent the components from deforming, and also makes it possible to ensure long-term reliability.

According to a third aspect of the invention, in the first or second aspects, when the medium guide member is at one-side limit of a pivotable range of the medium guide member and when the medium guide member is at the other-side limit of the pivotable range of the medium guide member, the guide surface is smoothly connected, on the downstream side of the guide surface, to a downstream-side guide surface that guides the medium downstream.

According to this aspect, when the medium guide member is at one-side limit of a pivotable range of the medium guide member and when the medium guide member is at the other-side limit of the pivotable range of the medium guide member, the guide surface is smoothly connected, on the downstream side of the guide surface, to a downstream-side guide surface that guides the medium downstream; therefore, the medium can be consistently transported without becoming hung up.

According to a fourth aspect of the invention, in one of the first through third aspects, a driving roller capable of forward and reverse rotation and a slave roller that nips the medium with the driving roller are provided downstream from the medium guide member; and a skew removal operation, which releases the leading edge of the medium in the upstream direction from between the driving roller and the slave roller by rotating the driving roller in reverse after the leading edge of the medium has been fed downstream by a predetermined amount from between the driving roller and the slave roller, can be executed.

According to this aspect, as it is possible to execute skew removal according to the so-called "nip-and-release" technique; the medium guide member retracts with certainty when releasing the medium, a space for the medium to flex can be ensured with certainty, which makes it possible to remove the skew as appropriate.

A fifth aspect of the invention is a scanner apparatus including a reading unit that reads a surface of a medium, and the medium transport apparatus according to one of the first through fourth aspects that transports the medium to a reading position of the reading unit.

Furthermore, a sixth aspect of the invention is a recording apparatus including a recording unit that records onto a medium, and the scanner apparatus according to the fifth aspect provided above the recording unit. According to these aspects, the scanner apparatus or the recording apparatus can achieve the same effects as those of the aforementioned first through fourth aspects.

Furthermore, a medium transport apparatus according to a seventh aspect of the invention includes: a curved transport path that transports a medium while bending the medium; a pair of first rollers that is disposed upstream from the curved transport path and that feeds the medium downstream; a pair of second rollers that is disposed downstream from the curved transport path and that feeds the medium downstream and upstream; and a mobile member that is disposed between the pair of first rollers and the pair of second rollers and that can move so as to change a space of the curved transport path. Here, the mobile member includes a guide surface that guides the medium fed downstream from the pair of first rollers and that guides the medium fed upstream from the pair of second rollers; and the mobile member sets the space of the curved transport path formed when guiding the medium fed upstream from the pair of second rollers to be greater than the space of the curved transport path formed when guiding the medium fed downstream from the pair of first rollers.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described hereinafter with reference to the drawings. However, it should be noted that the invention is not intended to be limited to the following embodiment, and many variations are possible without departing from the scope of the invention according to the appended claims; such variations are also to be considered as falling within the scope of the invention, and the following describes merely one embodiment of the invention.

Figure 1:
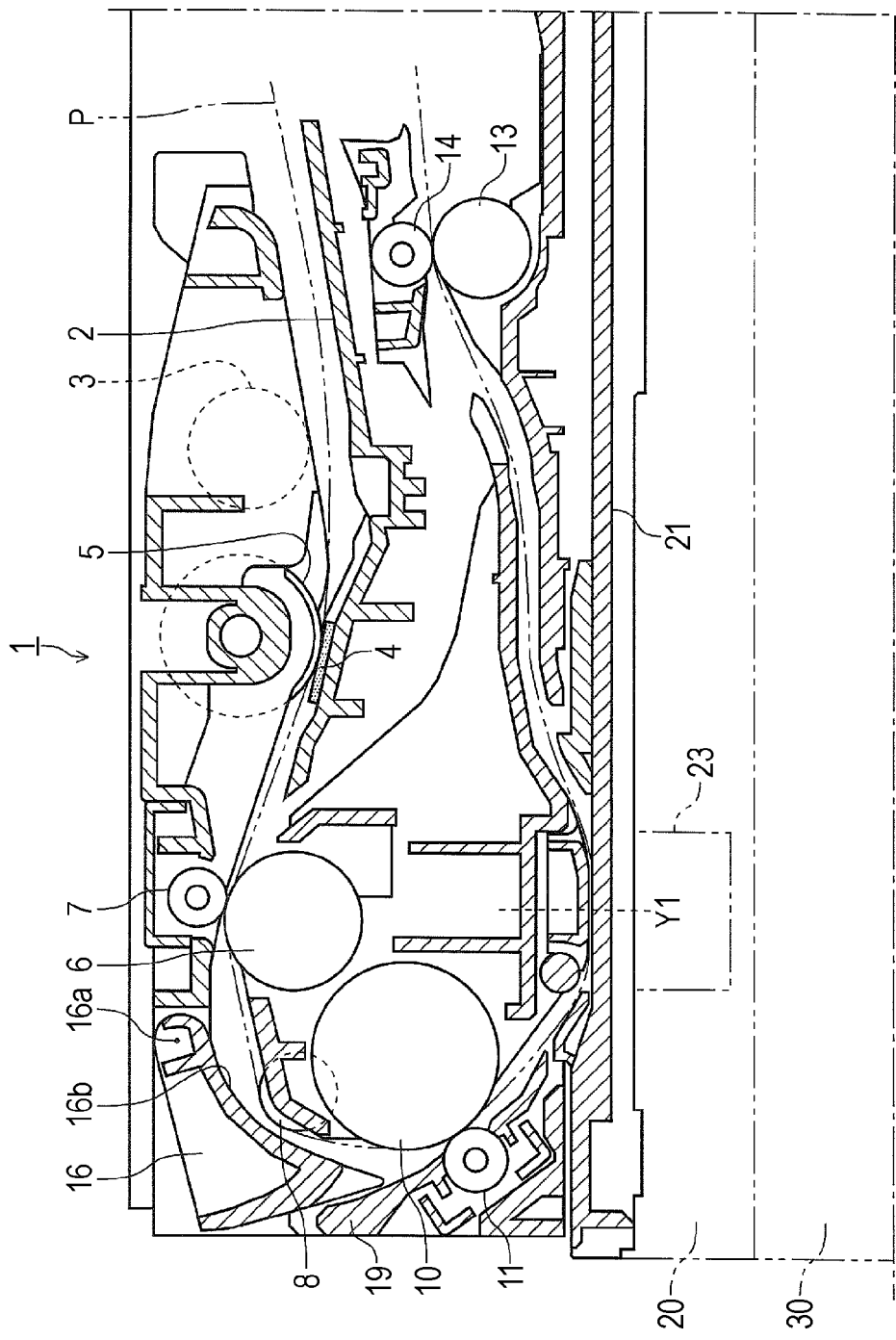
FIG. 1 is a cross-section of a medium transport apparatus according to the invention, viewed from the side.
Figure 2:
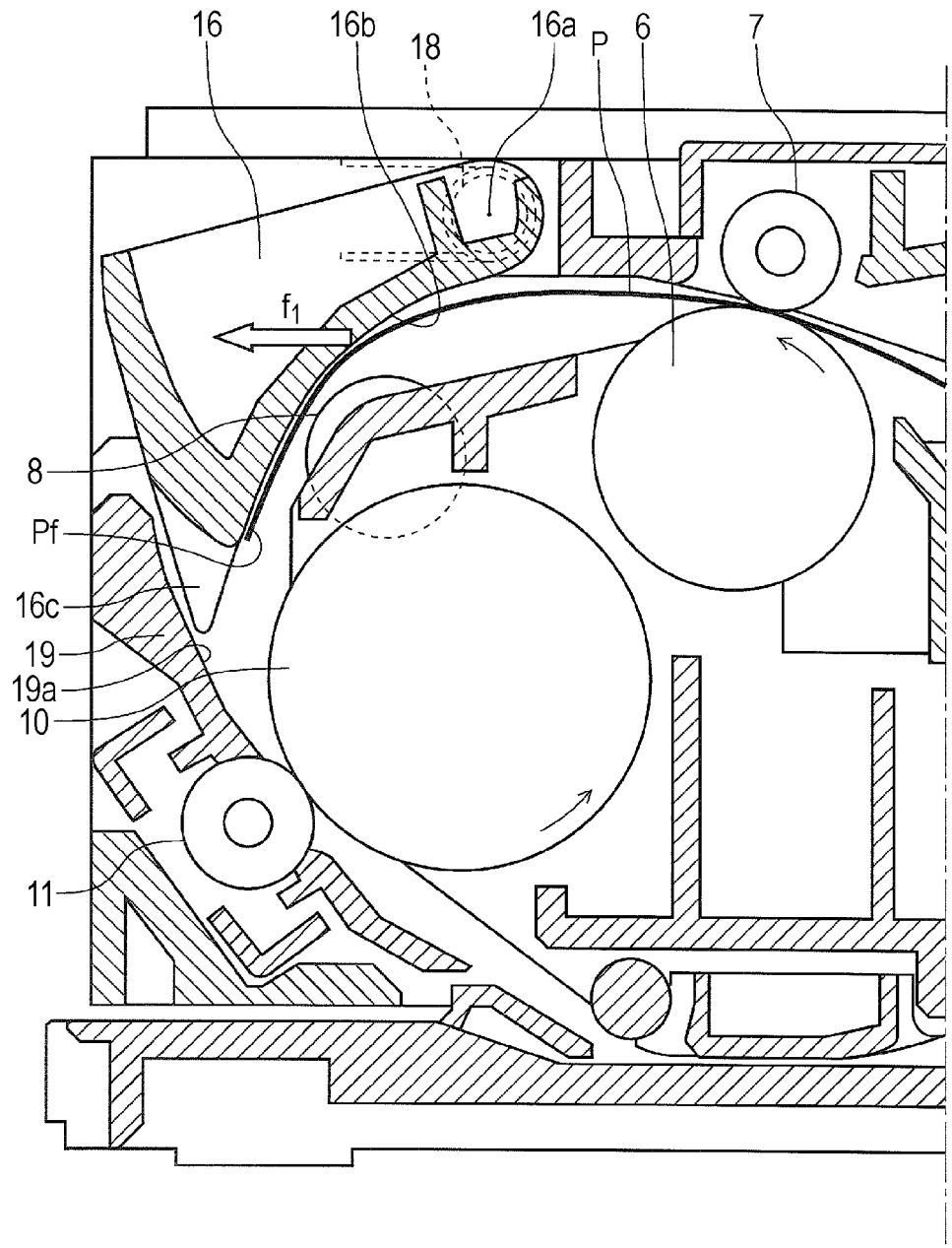
FIG. 2 is a diagram illustrating an enlargement of a medium transport path in the vicinity of a mobile flap illustrated in FIG. 1.
Figure 3:
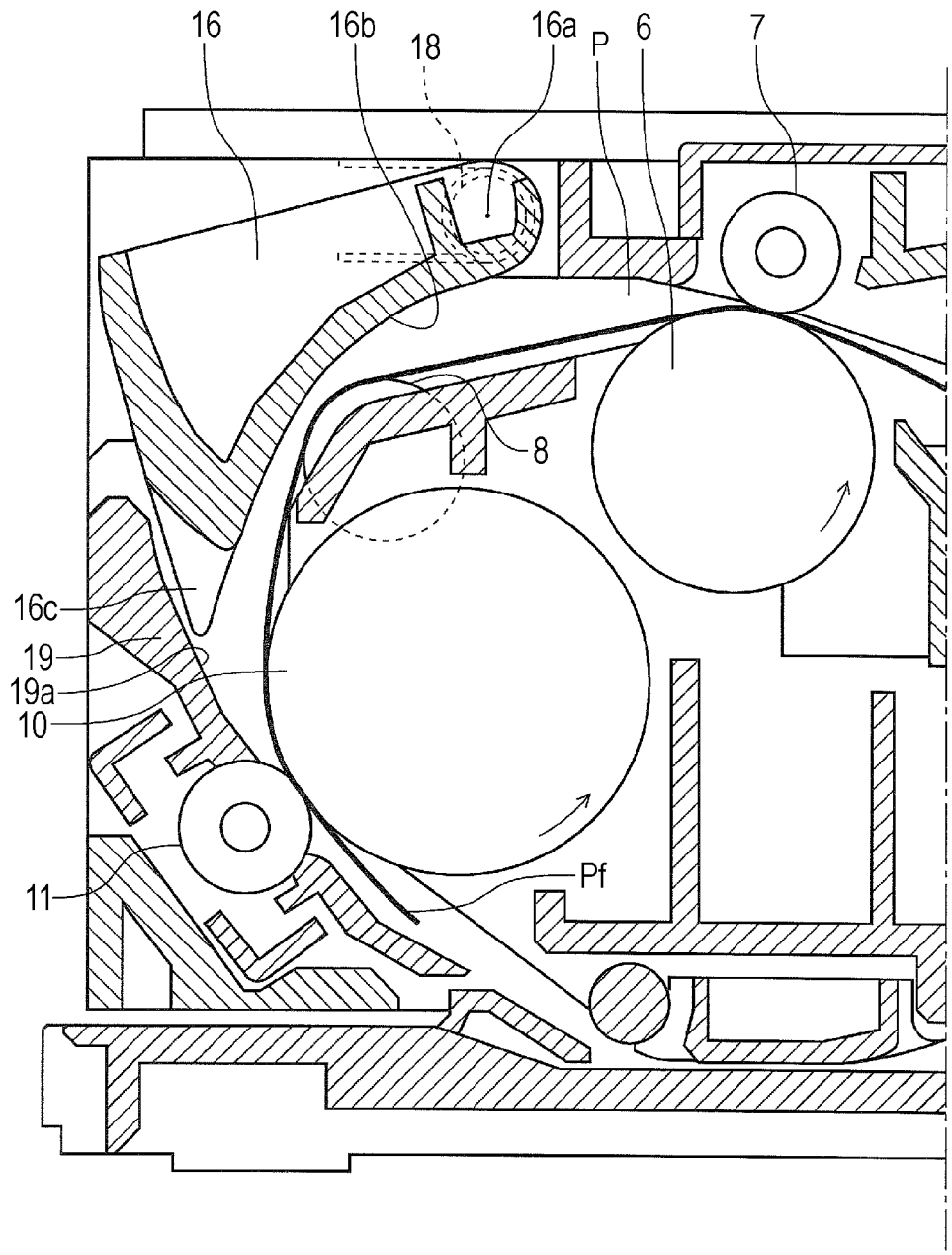
FIG. 3 is a diagram illustrating an enlargement of the medium transport path in the vicinity of the mobile flap illustrated in FIG. 1.
Figure 4:
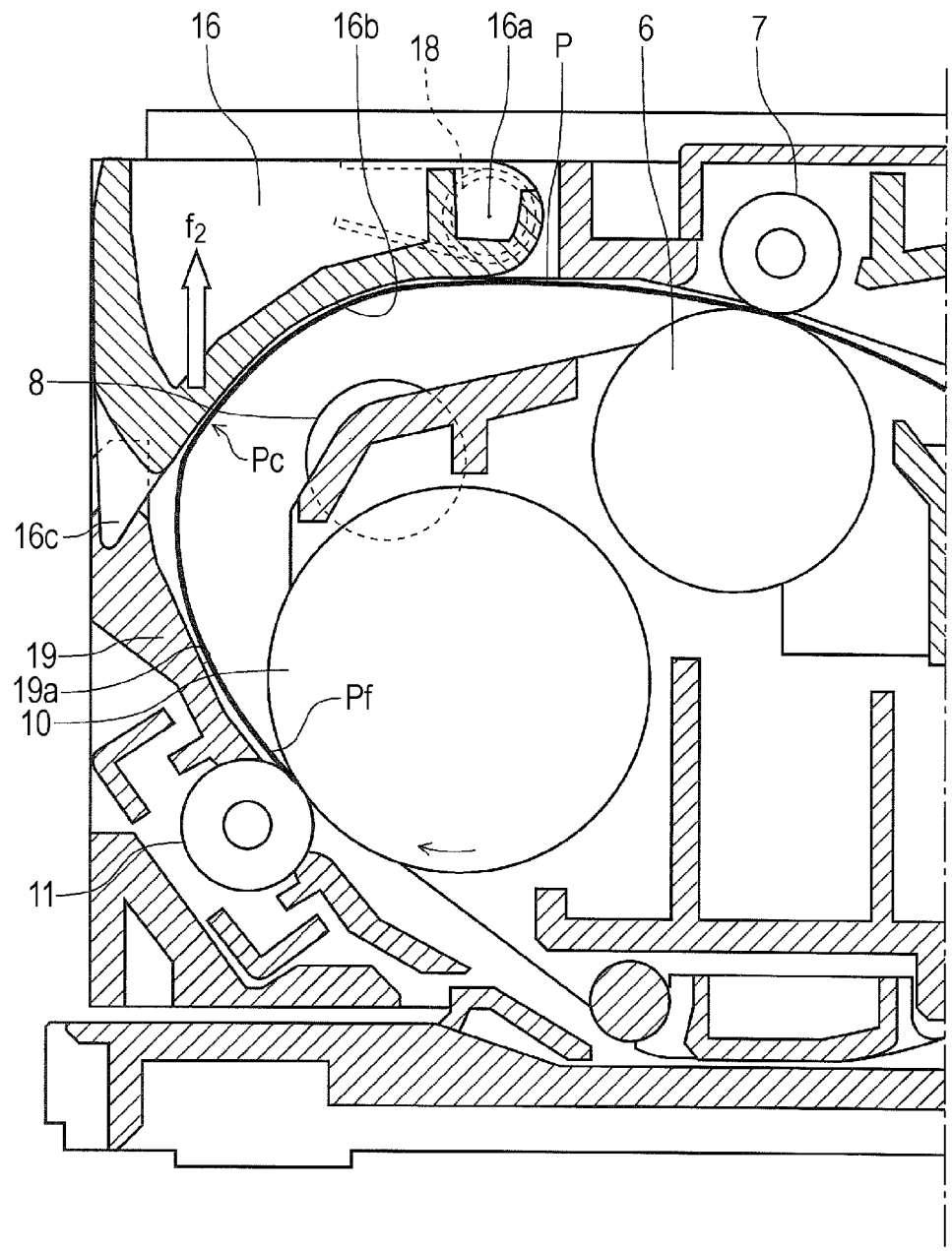
FIG. 4 is a diagram illustrating an enlargement of the medium transport path in the vicinity of the mobile flap illustrated in FIG. 1.

FIG. 1 is a cross-sectional diagram illustrating a medium transport apparatus (auto document feeder; ADF) 1 according to the invention, whereas FIGS. 2 through 4 are diagrams illustrating enlargements of a medium transport path in the vicinity of a mobile flap 16 illustrated in FIG. 1.

Hereinafter, a general description of configurations in the medium transport path of the medium transport apparatus 1 will be given with reference to FIG. 1. The medium transport apparatus 1 is provided in the uppermost area of an ink jet printer, the entirety of which is not shown in FIG. 1.

To be more specific, reference numeral 30 in FIG. 1 indicates a recording unit that carries out recording on a sheet; reference numeral 20 indicates a scanner unit provided in an upper portion of the recording unit 30; and the medium transport apparatus 1 is provided in an upper portion of the scanner unit 20. Reference numeral 2 indicates a document support tray, and a document serving as a medium is supported by this document support tray 2. Note that reference numeral P in FIG. 1 indicates a passage trajectory of the document that is transported in the medium transport apparatus 1.

A supply roller 3 driven by a motor (not shown) is provided at the leading edge side of the document support tray 2, so as to be capable of making contact with/separating from a plurality of documents stacked in the document support tray 2 due to a rising/lowering mechanism (not shown); the supply roller 3 feeds out the uppermost document, from the multiple documents stacked in the document support tray 2, in the downstream direction by rotating while making contact with the uppermost document.

A separating roller 5 that is driven in a forward rotational direction by a motor (not shown) and a separating pad 4 that nips the document with the separating roller 5 are disposed so as to oppose each other on the downstream side of the supply roller 3; the document that has been fed out is separated from the subsequent documents by that document being nipped between the separating roller 5 and the separating pad 4.

A roller, indicated by reference numeral 6, that is provided downstream from the supply roller 3, serves as an intermediate feed roller (a first roller) that is driven by a motor (not shown), whereas a roller indicated by reference numeral 7 indicates a slave roller that undergoes slave rotation by making contact with the intermediate feed roller 6.

A curved transport path (curved inverting path) that curves and inverts and then transports the document is formed downstream from the intermediate feed roller 6 and the slave roller 7. Reference numeral 16 indicates a mobile flap that forms part of the curved inverting path and that serves as a medium guide member that guides the document in the downstream direction. This mobile flap 16 is provided so as to be capable of pivoting central to a pivot axis 16a; by pivoting, the mobile flap 16 is capable of changing the size of a space in the curved transport path (details of this will be given later).

A guide roller 8 is provided in a freely-rotatable state, on the inner side of the curved inverting path; a large-diameter inverting roller 10 (second roller), which serves as a driving roller that is driven by a motor (not shown), is provided further downstream therefrom. The inverting roller 10 makes contact with a slave roller 11, and when the inverting roller 10 rotates while the document is nipped between the inverting roller 10 and the slave roller 11, the document is transported further downstream.

Downstream from the inverting roller 10 and the slave roller 11, the document reaches the upper surface of a document platform glass 21, of which the scanner unit 20 is partially configured. Reference numeral Y1 represents a document reading position of the scanner unit 20, and a sensor carriage 23, provided with a reading sensor that serves as a reading unit, is positioned at this reading position Y1, in a stopped state.

In other words, during reading in which the medium transport apparatus 1 is not used, the sensor carriage 23 scans the document located upon the document platform glass 21 by moving in the main scanning direction (in FIG. 1, the left-right direction); however, during reading in which the medium transport apparatus 1 is used, the sensor carriage 23 stops at the reading position Y1 and carries out scanning as the document moves.

A discharge driving roller 13 that is driven by a motor (not shown) and a slave roller 14 that undergoes slave rotation by making contact with the discharge driving roller 13 are provided downstream from the reading position Y1; the document that has been read is discharged toward a discharged paper receiving tray (not shown) by these rollers.

The general configuration of the medium transport apparatus 1 has been described thus far; hereinafter, the mobile flap 16 will be described in detail. The mobile flap 16 is a member that forms part of the curved transport path that, as shown in FIG. 1, transports the document while bending and inverting that document (that is, the part of the medium transport path spanning from the intermediate feed roller 6 to the reading position Y1) and is a member that guides the document in the downstream direction; the mobile flap 16 is provided on the outer side of the curved transport path so as to be capable of pivoting central to the pivot axis 16a, and causes the size of part of the space of the curved transport path to change by pivoting. It should be noted that the pivot axis 16a is the central position of a pivot shaft (not shown) formed in the mobile flap 16, and the mobile flap 16 is capable of pivoting by the pivot shaft being axially supported on a bearing (not shown).

FIG. 2 illustrates a state prior to a leading edge Pf of a document P reaching a position between the inverting roller 10 and the slave roller 11. Reference numeral 16b indicates a guide surface, and as shown in FIG. 2, the leading edge Pf of the document P proceeds downstream while sliding along the guide surface 16b. The mobile flap 16 is biased in the downward direction by a coil spring 18 that serves as a biasing unit, and the lowering posture of the mobile flap 16, shown in FIG. 2, is maintained by the biasing force and the mobile flap 16's own weight.

Next, as the feed operations continue, the leading edge Pf of the document P is nipped between the inverting roller 10 and the slave roller 11, and skew removal operations according to the nip-and-release technique are carried out in a state in which the leading edge Pf has advanced downstream from those rollers by a predetermined amount (FIG. 3).

In other words, in a state that the intermediate feed roller 6 on the upstream side of the inverting roller 10 has been stopped shown in FIG. 3, the inverting roller 10 is driven so as to rotate in the reverse direction. As a result, the leading edge Pf of the document P is released in the upstream direction from between the inverting roller 10 and the slave roller 11 (FIG. 4). At this time, the document P bulges greatly toward the outer side at the portion corresponding to the curved path (the portion indicated by reference numeral Pc), and the leading edge Pf of the document follows the area between the inverting roller 10 and the slave roller 11; skew is removed as a result.

At this time, the bulge area Pc formed by the document P pushes the mobile flap 16 upward, as indicated by the change from FIG. 3 to FIG. 4. Accordingly, the space in the curved path increases, the document P can flex to a sufficient degree, and as a result, the skew can be removed with certainty.

Incidentally, the pivot axis 16a of the mobile flap 16 is provided upstream from the guide surface 16b, whereas a free end 16c is provided downstream from the guide surface 16b. Through this, the following effects are achieved. Namely, when the leading edge Pf of the document P advances downstream while sliding along the guide surface 16b as shown in FIG. 2, of the force that the mobile flap 16 receives from the document leading edge Pf, the component of the force that pivots the mobile flap 16 is low, and thus the mobile flap 16 is not easily pivoted.

Note that, of the component of the force that the mobile flap 16 receives from the document leading edge Pf, the component of the force that pivots the mobile flap 16 is a component of the force that pushes the mobile flap 16 in the clockwise direction shown in FIG. 2. To be more specific, the force of a component that follows the radial direction relative to the pivot axis 16a of the mobile flap 16 is weak as a force that pivots the mobile flap 16, whereas the force of a component in a direction that is orthogonal to the radial direction is strong as a force that pivots the mobile flap 16.

For example, when the document leading edge Pf advances along the guide surface 16b of the mobile flap 16 as shown in FIG. 2, the mobile flap 16 receives a force f1 from the document leading edge Pf, but because this force f1 follows the radial direction, the force f1 is not so strong as a force that pivots the mobile flap 16.

Meanwhile, although applying a force to the free end 16c of the mobile flap 16 is the easiest way to move the mobile flap 16, if the document leading edge Pf has advanced as far as the free end 16*c*, the document leading edge Pf is in a free state, and thus the force applied to the free end 16*c* of the mobile flap 16 is not so great.

Meanwhile, when the document P bulges outward due to the reverse rotation of the inverting roller 10 as shown in FIG. 4, the bulge area Pc of the document P exerts a force f2 on the mobile flap 16; because this force follows the direction that is orthogonal to the radial direction, the force f2 is comparatively strong as a force that pivots the mobile flap 16.

Accordingly, the mobile flap 16 can be pivoted with ease, and a large space in which the document P flexes can be secured with ease. Accordingly, it is possible to put the mobile flap 16 in the appropriate state in accordance with the usage conditions, regardless of the rigidity of the document P.

In other words, there are flimsy types of documents and rigid types of documents, and if the biasing force of the coil spring 18 that biases the mobile flap 16 is, for example, set in accordance with a flimsy document, the mobile flap 16 will be pushed upward, not only during skew removal but also during normal paper transport, when transporting a document that is rigid, and thus there is a risk that the original goal of the skew removal cannot be achieved. Conversely, if the biasing force of the coil spring 18 that biases the mobile flap 16 is set in accordance with a rigid document, a flimsy document cannot push the mobile flap 16 upward during skew removal, and there is thus a risk that the original goal of the skew removal cannot be achieved. Accordingly, it is difficult to set an appropriate load for the coil spring 18, and the level of allowance thereof is low.

However, by disposing the pivot axis 16*a* of the mobile flap 16 on the upstream side as described above, a configuration is achieved in which it is difficult for the mobile flap 16 to retract during normal paper transport but easy for the mobile flap 16 to retract during skew removal; accordingly, it is easy to set an appropriate load for the coil spring 18, and the mobile flap 16 can thus be set to an appropriate state in accordance with the usage conditions regardless of the rigidity of the document P.

Although the mobile flap 16 is provided at a starting position of the curved inverting path in this embodiment, it should be noted that in the case where, for example, a roller pair that carries out nip-and-release on the leading edge of the document during skew removal (in this embodiment, the inverting roller 10 and the slave roller 11) is provided further downstream from the position illustrated in FIG. 1, the mobile flap 16 may be provided at an ending position of the curved inverting path (that is, a lower area of FIG. 1).

Furthermore, in this embodiment, the mobile flap 16 is provided so as to narrow part of the space of the curved transport path when the mobile flap 16 is lowered due to a combination of the biasing force of the coil spring 18 and the mobile flap 16's own weight. Accordingly, it is not necessary to ensure a high biasing force for the coil spring 18; a high level of stress is thus not placed on the constituent elements by the biasing force of the coil spring 18, which makes it possible to prevent the components from deforming, and also makes it possible to ensure long-term reliability.

In addition, in this embodiment, both when the mobile flap 16 is at one-side limit of the pivotable range thereof (FIG. 2) and when the mobile flap 16 is at the other-side limit of the pivotable range thereof (FIG. 4), the guide surface 16*b* is smoothly connected, on the downstream side of the guide surface 16*b*, to a guide surface 19*a* of a guide member 19 that guides the document downstream. Accordingly, the document leading edge Pf will not become hung up during normal paper transport (FIG. 2), whereas during skew removal (FIG. 4), the document will not enter unnaturally into the space between the guide surface 16*b* and the guide surface 19*a* and will therefore not have creases formed therein.

The entire disclosure of Japanese Patent Application No. 2011-44049, filed Mar. 1, 2011 is expressly incorporated by reference herein.

What is claimed is:

1. A scanner apparatus comprising:
a reading unit that reads a surface of a medium;
a curved inverting transport path that transports a medium, that is arranged in an upstream side of the reading unit;
a medium guide member that forms part of an upstream side of the curved inverting transport path and guides the medium to a downstream side, and that is provided so as to be capable of pivoting at an outward side from the curved inverting transport path, and that changes the size of a space of part of the curved inverting transport path by pivoting;
a first feeding roller that includes a first driving roller capable of forward rotation and a first slave roller that nips the medium with the first driving roller, that is provided in the upstream side of the curved inverting transport path; and
a second feeding roller that includes a second driving roller capable of forward and reverse rotation and a second slave roller that nips the medium with the driving roller, that is provided in a downstream side of the curved inverting transport path,
wherein the medium guide member has a pivot axis that is in an upstream side of the medium guide member,
wherein the curved inverting transport path keeps a curved shape when the medium guide member is pivoted,
wherein cooperation of the first feeding roller and the second feeding roller to remove skew bulges the medium outwardly in the curved transport path,
wherein when the first feeding roller and the second feeding roller cooperate to remove skew, the medium exerts a force on the medium that is orthogonal to a radial direction of the pivot axis, and the medium guide member pivots to the outward side.

2. The scanner apparatus according to claim 1,
wherein the medium guide member is provided in a state that narrows the space of part of the curved inverting transport path when the medium guide member is in a posture in which the medium guide member is lowered, in addition due to the biasing force of a biasing unit that biases the medium guide member, due to the medium guide member's own weight.

3. The scanner apparatus according to claim 2,
wherein when the medium guide member is at one-side limit of a pivotable range of the medium guide member and when the medium guide member is at the other-side limit of the pivotable range of the medium guide member, the guide surface is smoothly connected, on the downstream side of the guide surface, to a downstream-side guide surface that guides the medium downstream.

4. The scanner apparatus according to claim 1,
the skew removal operation, which releases the leading edge of the medium in the upstream direction from between the second driving roller and the second slave roller by rotating the second driving roller in reverse after the leading edge of the medium has been fed downstream by a predetermined amount from between the second driving roller and the second slave roller, can be executed.

5. A recording apparatus comprising:
a recording unit that records onto a medium; and the scanner apparatus according to claim 1 provided above the recording unit.

6. A scanner apparatus comprising:

a reading unit that reads a surface of a medium;

a curved inverting transport path that transports a medium while bending the medium, that is arranged an upstream of the reading unit;

a pair of first rollers that is disposed upstream from the curved inverting transport path and that feeds the medium downstream;

a pair of second rollers that is disposed downstream from the curved inverting transport path and that feeds the medium downstream and upstream; and a mobile member that is disposed between the pair of first rollers and the pair of second rollers and that can move so as to change a space of the curved inverting transport path, wherein the mobile member includes a guide surface that guides the medium fed downstream from the pair of first rollers and that guides the medium fed upstream from the pair of second rollers;

wherein the mobile member has a pivot axis that is in an upstream side of the mobile member, wherein the curved inverting transport path has been kept a curved shape when the mobile member is moved, wherein cooperation of the pair of first rollers and the pair of the second rollers to remove skew bulges the medium outwardly in the curved transport path, pivots the mobile member outwardly, and expands the space of the curved inverting transport path, wherein when the pair of first rollers and the pair of the second rollers cooperate to remove skew, the medium exerts a force on the mobile member that is orthogonal to radial direction of the pivot axis.

\* \* \* \* \*